United States Patent
Lee et al.

(10) Patent No.: US 8,621,140 B2
(45) Date of Patent: Dec. 31, 2013

(54) FLASH MEMORY APPARATUS FOR CONTROLLING OPERATION IN RESPONSE TO GENERATION OF INTERRUPT SIGNAL AND METHOD OF CONTROLLING THE SAME

(75) Inventors: Choong Hun Lee, Yongin-si (KR); Jae Don Lee, Paju-si (KR); Min Young Son, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 538 days.

(21) Appl. No.: 12/639,858

(22) Filed: Dec. 16, 2009

(65) Prior Publication Data

US 2010/0235566 A1    Sep. 16, 2010

(30) Foreign Application Priority Data

Mar. 11, 2009   (KR) .................. 10-2009-0020584

(51) Int. Cl.
  *G06F 12/00*   (2006.01)
(52) U.S. Cl.
  USPC ............ 711/103; 711/147; 711/150; 710/260
(58) Field of Classification Search
  USPC ..................... 711/103, 147, 150; 710/260
  See application file for complete search history.

(56) References Cited

U.S. PATENT DOCUMENTS

| | | | | |
|---|---|---|---|---|
| 5,428,579 A | * | 6/1995 | Robinson et al. | 365/230.03 |
| 5,956,743 A | * | 9/1999 | Bruce et al. | 711/103 |
| 7,978,516 B2 | * | 7/2011 | Olbrich et al. | 365/185.11 |
| 2003/0093612 A1 | * | 5/2003 | Ootani et al. | 711/103 |
| 2006/0080672 A1 | * | 4/2006 | Smith et al. | 719/317 |
| 2007/0106934 A1 | * | 5/2007 | Muschett et al. | 715/513 |
| 2009/0207663 A1 | * | 8/2009 | Kang | 365/185.18 |

FOREIGN PATENT DOCUMENTS

| | | |
|---|---|---|
| KR | 1020070070148 | 3/2007 |
| KR | 1020070057337 | 6/2007 |
| KR | 100817087 | 3/2008 |

* cited by examiner

*Primary Examiner* — Hong Kim
(74) *Attorney, Agent, or Firm* — NSIP Law

(57) ABSTRACT

Described herein is a flash memory apparatus and method controlling the same. The flash memory apparatus includes a processor and one or more flash memory units. The processor controls one or more memory operations performed in the one or more flash memory units. The processor stops controlling a memory operation in a flash memory unit when the memory operation is performed, and continues performing the memory operation in the flash memory unit when the flash memory unit generates an interrupt signal.

9 Claims, 4 Drawing Sheets

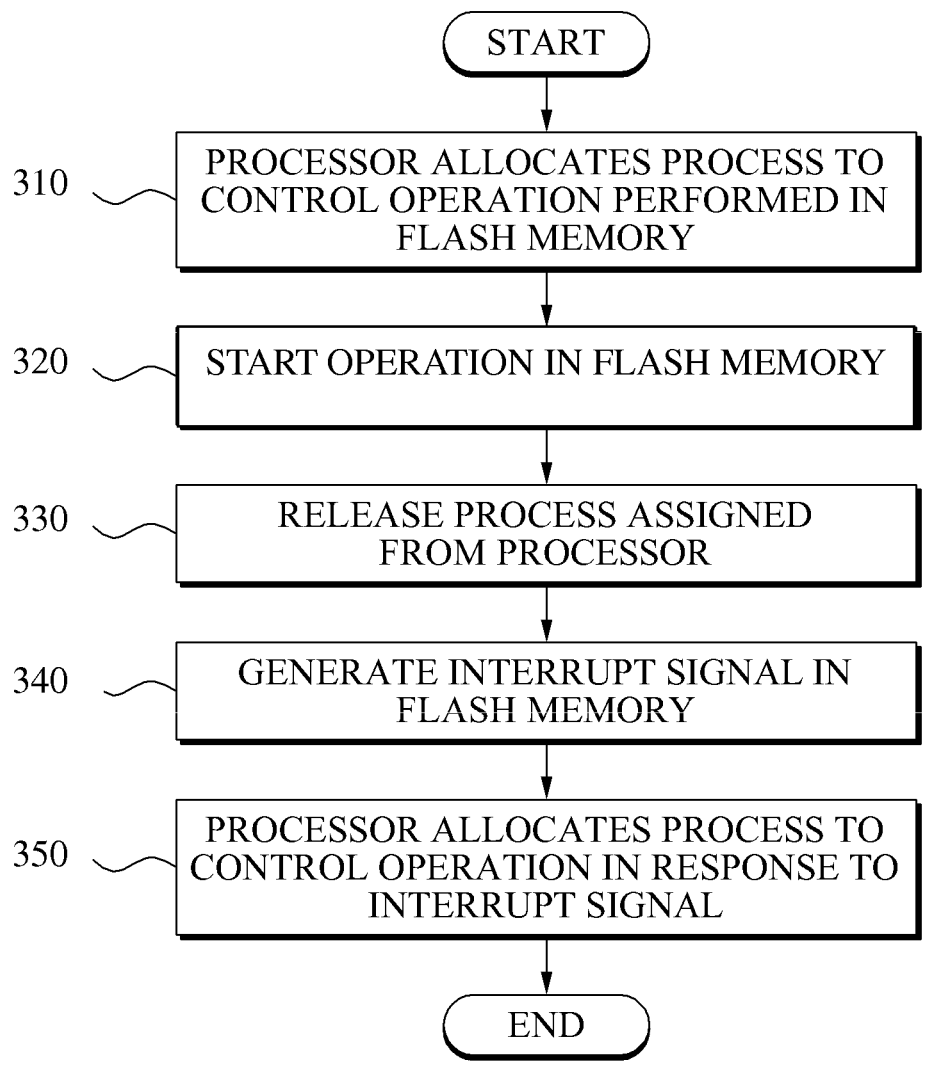

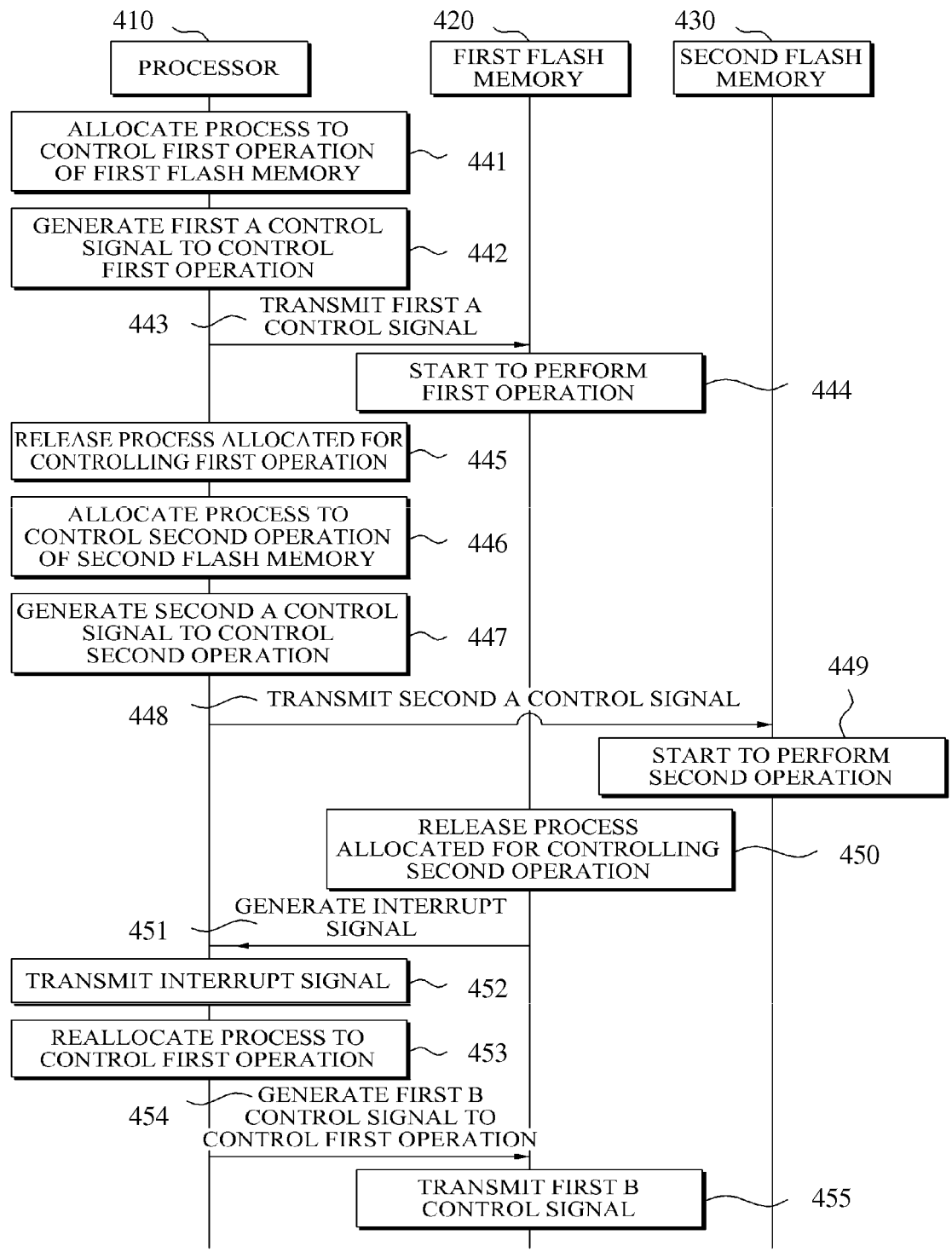

FLASH MEMORY APPARATUS FOR CONTROLLING OPERATION IN RESPONSE TO GENERATION OF INTERRUPT SIGNAL AND METHOD OF CONTROLLING THE SAME

CROSS-REFERENCE TO RELATED APPLICATION

This application claims the benefit under 35 U.S.C. §119(a) of a Korean Patent Application No. 10-2009-0020584, filed on Mar. 11, 2009, in the Korean Intellectual Property Office, the entire disclosure of which is incorporated herein by reference for all purposes.

BACKGROUND

1. Field

The following description relates to a flash memory apparatus and controlling method thereof, and more particularly, to a flash memory apparatus and method that reduces the operating time of the flash memory.

2. Description of Related Art

Examples of a storage device storing data include a magnetic disk, an optical disk, a semiconductor device, and the like. The physical characteristics and the optimal management methods are different for each type of storage device. Therefore, a management method that corresponds to the physical characteristics of a particular storage device is desired.

Conventionally, magnetic disks are widely used in a storage device. A read/write time of the magnetic disk takes an average of several milliseconds per kilobyte. Also, the read/write time of the magnetic disk varies, because an arrival time of an arm of the magnetic disk is different depending on a physical location of where data is stored.

Recently, a non-volatile memory device which takes a relatively short read/write time, consumes a small amount of power, and occupies a small amount of space, compared a magnetic disk, has been designed to replace the magnetic disk. The non-volatile memory device may electrically read, write, and erase data. The non-volatile memory device may be a semiconductor device that is able to maintain stored data even when power is cut off. A process that stores data in the non-volatile memory device is referred to as programming, writing, storing, and the like.

Programming with respect to the non-volatile memory device may be performed in page units and erasing may be performed in page units and/or in block units. A block unit may include one or more page units. A controller of the non-volatile memory device may provide a logical address to an external host or processor, and provide a physical address with respect to a non-volatile memory device. The controller may manage the non-volatile memory device using the physical address and may convert the physical address into the logical address. A layer where converting of the physical address and logical address is performed as described above is referred to as a flash translation layer (FTL).

An exemplary storage device using a flash memory that is a non-volatile memory device is a solid state drive (SSD). The SSD may include a plurality of flash memory chips and buses, a controller, and a memory that buffers a request from a host system.

When a first operation, for example, a read operation, a write operation, or the like, is performed with respect to the flash memory in the flash memory apparatus, such as the SSD, a controller or a CPU typically allocates a process to the operation until the performed operation is finished. After the first operation is finished, the CPU allocates a process to a second operation that is to be performed.

SUMMARY

In one general aspect, there is provided a flash memory apparatus, comprising a flash memory unit to store data and to generate an interrupt signal, and a processor to control one or more memory operations performed in the flash memory unit, wherein the processor stops controlling a memory operation when the memory operation is started, and continues to control the memory operation when an interrupt signal is generated by the flash memory unit.

The one or more memory operations may be at least one of a read operation, a write operation, an erase operation, and a copy operation.

The processor may generate a control signal to control a memory operation and transmits the control signal to the flash memory unit, and the flash memory starts the memory operation in response to the control signal.

The flash memory unit may be at least one of a flash memory chip group in a bank unit and a flash memory chip group in a channel unit.

The processor may allocate a process to control the memory operation and releases the process when the memory operation starts. The processor may reallocate the process to control the memory operation when the interrupt signal is generated by the flash memory unit.

In another aspect, provided is a method of controlling a flash memory, the method comprising allocating a process to control a memory operation performed in a first flash memory unit, releasing the allocated process to control the first memory operation when the first memory operation is started, allocating a process to control a second memory operation performed in a second flash memory unit, and releasing the allocated process to control the second memory operation and reallocating the process to control the first memory operation, in response to an interrupt signal generated by the first flash memory unit.

The first memory operation and the second memory operation may include at least one of a read operation, a write operation, an erase operation, and a copy operation.

The allocating a process may include generating a control signal to control the memory operation, and the memory operation starts in response to the control signal.

In another aspect, provided is a computer readable recording media storing a program implementing a method of controlling a flash memory, the method comprising allocating a process to control a memory operation performed in a first flash memory unit, releasing the allocated process to control the first memory operation when the first memory operation is started, allocating a process to control a second memory operation performed in a second memory unit, and releasing the allocated process to control the second memory operation and reallocating the process to control the first memory operation, in response to an interrupt signal.

In another aspect, provided is a flash memory apparatus to perform memory operations in parallel, the apparatus comprising a plurality of flash memory units including a first flash memory unit to store data and to generate an interrupt signal, and a second flash memory unit, and a processor to allocate a process to a plurality of memory operations performed in the plurality of flash memory units, wherein the processor allocates a process to control a first memory operation performed in the first flash memory unit, releases the process when the first memory operation is started, allocates a process to control a second memory operation performed in the second flash memory, and releases the process to control the second memory operation and reallocates the process to control the first memory operation, when an interrupt signal is generated by the first flash memory unit.

The processor may generate a first control signal to control the first memory operation. The processor may generate a second control signal to control the second memory operation.

Other features and aspects will be apparent from the following detailed description, the drawings, and the claims.

BRIEF DESCRIPTION OF THE DRAWINGS

FIG. 3 is a flowchart illustrating an example of a method of controlling a flash memory apparatus.

FIG. 4 is a flowchart illustrating an example of a method of controlling a flash memory apparatus that includes two flash memory units.

Figure 1:
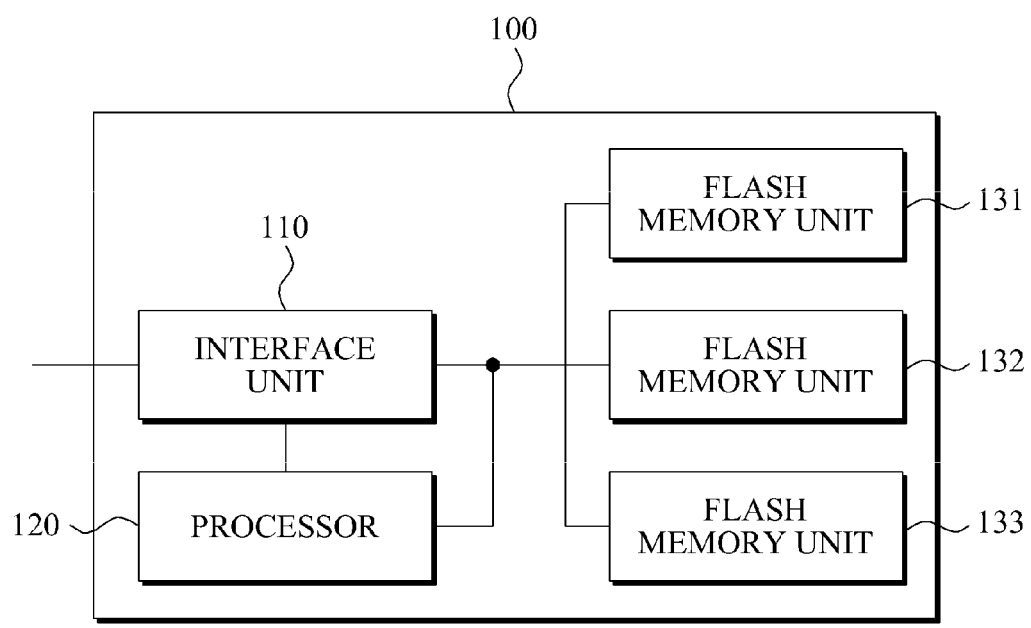
FIG. 1 is a block diagram illustrating an example flash memory apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

FIG. 1 illustrates an example flash memory apparatus 100.

The flash memory apparatus 100 includes an interface unit 110, a processor 120, and flash memory units 131, 132, and 133.

The non-limiting example shown in FIG. 1 illustrates the flash memory apparatus 100 that includes three flash memory units 131, 132, and 133. While the flash memory apparatus is depicted in FIG. 1 with three flash memory units, the flash memory apparatus is not limited to three flash memory units. The flash memory apparatus may comprise one or more flash memory units, for example, the flash memory may comprise one flash memory unit, two flash memory units, three flash memory units, or more.

The interface unit 110 may connect an external host (not illustrated) to the flash memory apparatus 100.

The interface unit 110 may perform interfacing with the external host based on a predetermined protocol, to receive a signal or data from the external host.

The processor 120 may control an operation performed in the flash memory units 131, 132, and 133.

When a memory operation is performed in one or more of the flash memory units 131, 132, and/or 133, the processor 120 may allocate a process with respect to the performed memory operation to control the memory operation. The memory operation may be performed in the flash memory units.

The flash memory units 131, 132, and 133 are storing media that may store data. The flash memory units 131, 132, and 133 may include at least one flash memory chip. The flash memory units 131, 132, and 133 may be flash memory in a group unit including one or more flash memory chips.

For example, the flash memory units 131, 132, and 133 may be a flash memory chip group in a back unit or a flash memory chip group in a channel unit.

The memory operation that may be performed in the flash memory units 131, 132, and 133 may be one or more of a read operation, a write operation, an erase operation, and/or a copy operation.

The processor 120 may generate a control signal to control the memory operation and may transmit the generated control signal to the flash memory units 131, 132, and 133. The flash memory units 131, 132, and 133 may start to perform the memory operation in response to the transmitted control signal.

The flash memory apparatus 100 may use an interrupt signal and a process allocation/release to optimize efficiency in operating the flash memory apparatus 100.

The memory operation may be performed in one or more of the flash memory units 131, 132, and 133. When a first memory operation is performed in a first flash memory unit, the processor 120 may allocate a process to the first memory operation to control the first memory operation. When the first memory operation is started in the first flash memory unit, the processor 120 may release the process allocated to the first memory operation. At this time the process is no longer allocated to the first memory operation. After a period of time, the first flash memory unit may generate an interrupt signal. The processor 120 may reallocate the process to the first memory operation in the first flash memory when an interrupt signal is generated by the first flash memory unit, and the processor may again begin to control the process of the first memory operation in the first flash memory unit.

Accordingly, the processor 120 does not need to allocate the process to control the memory operation during the period of time from when the controlling of the first memory operation is stopped to the time when the controlling of the first memory operation is continued. Therefore, the processor 120 may allocate a process for another task other than the controlling of the first memory operation, thus increasing an efficiency of the flash memory apparatus.

For example, when a data write operation is performed in the flash memory unit 131, the processor 120 may allocate a process with respect to the data write operation, generate a control signal to control the data write operation, and transmit the generated control signal to the flash memory unit 131.

Subsequently, the flash memory unit 131 may receive data from the external host via the interface unit 110 in response to the control signal, and perform the data write operation.

In this example, when the data write operation is started in the flash memory unit 131, the processor 120 releases the process allocated to the data write operation and stops controlling the data write operation of the flash memory unit 131. The processor 120 may begin to control the data write operation of the flash memory unit 131 again, when the interrupt signal is generated by the flash memory unit 131.

Therefore, the processor 120 may allocate a process to control a memory operation of other flash memory units, for example, flash memory units 132 and/or 133 during the period of time when the controlling of the data write operation of the flash memory unit 131 is stopped to the time when the controlling of the flash memory unit 131 is continued. Accordingly, the processor 120 may control the flash memory apparatus 100 to enable the memory operation of the other flash memory units 132 and/or 133 to be performed in parallel with the memory operation of the flash memory unit 131. Thus, multi-threading with respect to memory operations of a plurality of flash memory units is possible.

A memory operation of the flash memory apparatus 100 will be described with reference to FIG. 2.

Figure 2:
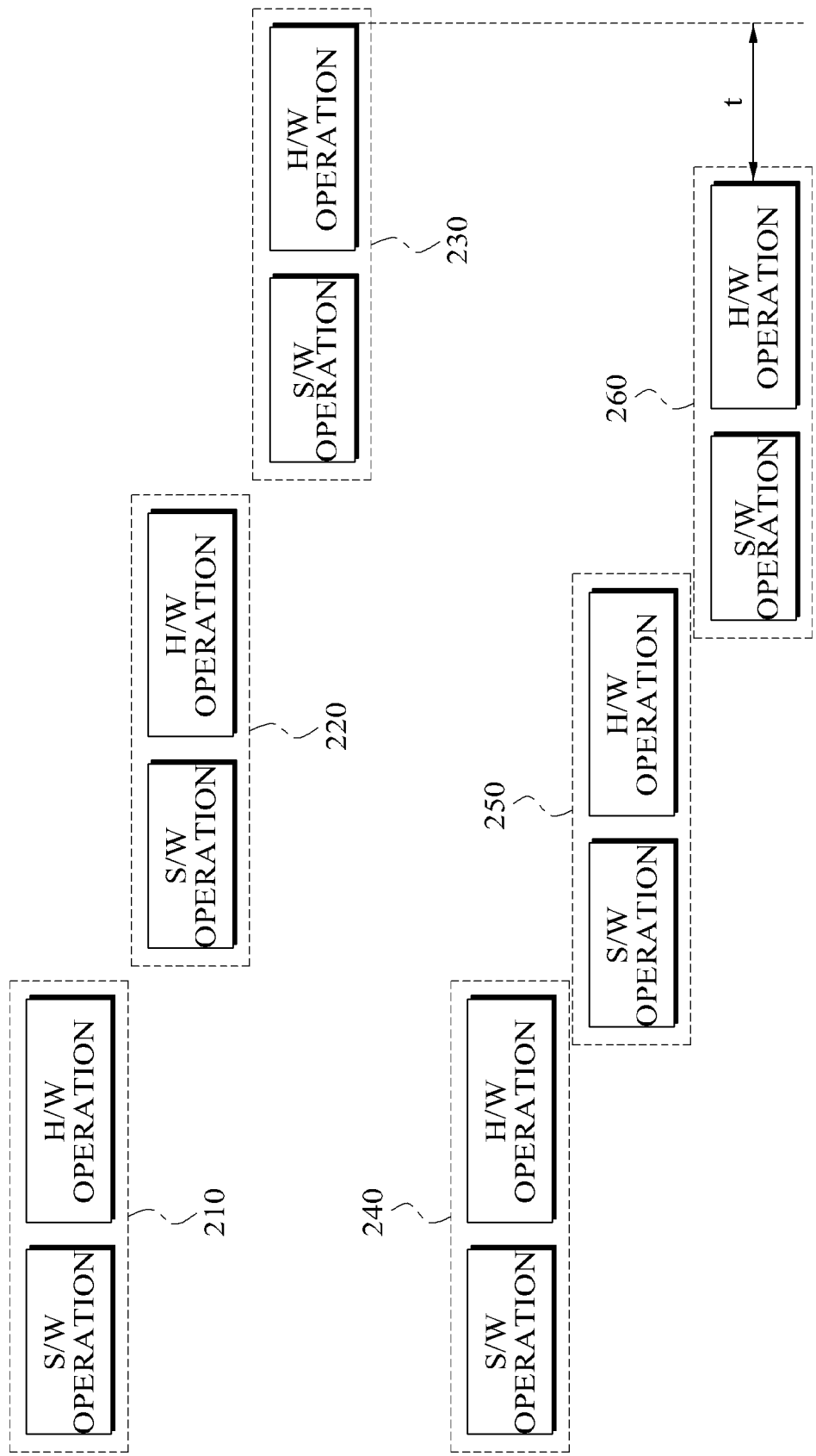
FIG. 2 illustrates an example of a memory operation performed in parallel in a flash memory apparatus.

FIG. 2 illustrates an example of a memory operation performed in parallel in a flash memory apparatus.

In the non-limiting example shown in FIG. 2, the flash memory apparatus includes three flash memory units, a first flash memory unit, a second flash memory unit, and a third flash memory unit.

In this example, memory operation 210 and memory operation 240 are operations performed in a first flash memory unit. Memory operation 220 and memory operation 250 are operations performed in a second flash memory. Memory operation 230 and memory operation 260 are operations performed in a third flash memory unit.

As referred to herein, a software operation includes an operation of generating a control signal in a processor and transmitting the generated control signal to a flash memory unit, and a hardware operation includes a memory operation, for example, a read operation, a write operation, an erase operation, and/or a copy operation, of the flash memory unit. A software operation or a hardware operation may comprise a plurality of operations.

The memory operations 210, 220, and 230 are memory operations of the flash memory apparatus that are performed without using a multi-threading scheme.

The memory operations may include software operations and/or hardware operations. In this example, the memory operations 210, 220, and 230, include software operations and hardware operations. The memory operations performed in the flash memory units may be independently performed without overlapping with each other.

For example, in a case where the flash memory apparatus performs memory operations without using the multi-threading scheme, a memory operation of second flash memory unit is not performed until a memory operation of the first flash memory unit is completed. In this example, the memory operation of the second flash memory unit is not be performed until the memory operation of the first flash memory unit is completed because the processor continuously allocates a process with respect to the memory operation to check a status of a hardware operation of the flash memory unit until the memory operation performed in the first flash memory unit is completed.

The processor maintains a waiting status until the memory operation is completed in the first flash memory apparatus. This method is not the most efficient use of the processor.

The memory operations 240 through 260 are memory operations of the flash memory apparatus performed using a multi-threading scheme.

In this non-limiting example, the memory operations 240, 250, and 260, may be performed in parallel with each other.

That is, in a case that the flash memory apparatus performs memory operations using the multi-threading scheme, the processor does not continuously allocate a process to the first flash memory unit until the memory operation is completed in the first flash memory unit. Thus, a memory operation of the second and/or third flash memory unit may be performed in parallel to the memory operation being performed in the first flash memory. The multi-threaded scheme may be realized through generation of an interrupt signal in the flash memory unit and release/allocation of a process in the processor.

For example, when the processor completes performing the software operation with respect to the first flash memory unit, the processor may release a process allocated for controlling the first operation 240 of the first flash memory unit, and may allocate a process for controlling the second operation 250 of the second flash memory unit. In this example, the hardware operation of the first flash memory unit is performed in parallel with the software operation for controlling the second operation 250.

The first flash memory unit may use a control signal. The first flash memory unit may generate an interrupt signal, and the processor may receive the interrupt signal and stop performing the process for controlling the second operation 250 and generate the control signal to control the first operation 240. Accordingly, memory operations of a plurality of flash memory units may be performed in parallel.

As described above, when the flash memory apparatus uses the multi-threading scheme, efficiency of the processor increases in comparison to the example above where the processor does not use the multi-threading scheme. As illustrated in FIG. 2, the amount of time expended for completing the memory operations for operations 240, 250, and 260, is less than the amount of time expended for completing the memory operations for operations 210, 220, and 230. The variable "t" of FIG. 2 indicates the reduced operation time.

Reduction of the time occurs because the processor does not continuously allocate a process to the first memory operation to check a status of the hardware operation of the first flash memory unit until the first memory operation performed in the first flash memory unit is completed.

FIG. 3 is a flowchart illustrating an example of a method of controlling a flash memory apparatus.

The flash memory apparatus may include a processor and a flash memory.

A processor allocates a process to control a memory operation performed in the flash memory in 310.

The memory operation performed in the flash memory may be at least one of a read operation, a write operation, an erase operation, and/or a copy operation.

In 320, the operation is started in the flash memory.

According to an example embodiment, 310 may include generating a control signal to control the memory operation performed in the flash memory. Also, the memory operation performed in the flash memory may be performed in response to the control signal in 320.

In 330, the allocated process is released by the processor. That is, when the memory operation of the flash memory is started in 320, the processor may release the process allocated for controlling the memory operation in 330.

In 340, an interrupt signal is generated in the flash memory. The interrupt signal may be generated when the flash memory uses the control signal of the processor.

In 350, the processor reallocates the process to control the memory operation of the flash memory, in response to the interrupt signal.

The method of controlling a flash memory apparatus has been described in the above description or will be described below, and thus, detailed description is omitted here.

FIG. 4 is a flowchart illustrating an example of a method of controlling a flash memory apparatus that includes two flash memory units.

In the non-limiting example shown in FIG. 4, the flash memory apparatus includes a processor 410, and a first flash memory unit 420, and a second flash memory unit 430. The method may be used to control more than two flash memory units, for example, three flash memory units or more. Also, more than one processor may be used, for example, two processors, three processors, or more.

In 441, the processor 410 allocates the processor 410 to control a first operation of the first flash memory unit 420.

In 442, the processor 410 generates a first A control signal to control the first operation.

The first A control signal is transmitted to the first flash memory unit 420 in 443.

The first flash memory unit 420 that receives the first A control signal starts to perform the first operation in 444.

When the first operation is started, the processor 410 releases the process allocated for controlling the first operation in 445, allocates another process to control a second operation of the second flash memory unit 430 in 446, and generates a second A control signal to control the second operation in 447. The processor 410 transmits the generated second A control signal to the second flash memory unit 430 in operation 448.

The second flash memory unit 430 that receives the second A control signal starts to perform the second operation in 449.

When the second operation is started, the processor 410 releases the process allocated for controlling the second operation in 450.

Subsequently, when the first flash memory unit 420 generates an interrupt signal in 451 and transmits the generated interrupt signal to the processor in 452. The processor 410 reallocates the process to control the first operation in 453, generates a first B control signal to control the first operation in 454, and transmits the generated first B control signal to the first flash memory unit 420 in 455.

Accordingly, performing parallel memory operations in two flash memory units is made possible.

A few example embodiments of the method of controlling the flash memory apparatus have been shown and described, and the flash memory apparatus described in FIG. 1 is applicable to the present example embodiment. Accordingly, detailed descriptions thereof will be omitted here.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

Flash memory devices and/or memory controllers may be included in various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The flash memory devices and/or the memory controllers may constitute memory cards. In this case, the memory controllers may be constructed to communicate with an external device for example, a host using any one of various types of interface protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that can maintain stored data even when power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a DVD, a router, and a Global Positioning System (GPS).

A computing system or a computer may include a microprocessor that is electrically connected with a bus, a user interface, and a memory controller. It may further include a flash memory device as described herein. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A flash memory apparatus, comprising:
    a flash memory unit configured to store data and to generate an interrupt signal; and
    a processor configured to allocate a process for controlling a memory operation performed by the flash memory unit, the processor further configured to transmit a control signal to the flash memory unit in accordance with the process, wherein:
    the processor releases the allocated process after transmission of the control signal to the flash memory unit,
    the flash memory transmits the interrupt signal to the processor after using the control signal, and
    the processor re-allocates the process for controlling the memory operation after receiving the interrupt signal.

2. The flash memory apparatus of claim 1, wherein the memory operation is at least one of a read operation, a write operation, an erase operation, and a copy operation.

3. The flash memory apparatus of claim 1, wherein the flash memory starts the memory operation in response to the control signal.

4. The flash memory apparatus of claim 1, wherein the flash memory unit is at least one of a flash memory chip group in a bank unit and a flash memory chip group in a channel unit.

5. A method of controlling a flash memory, the method comprising:

allocating, with a processor, a first process for controlling a first memory operation performed by a first flash memory;

transmitting a first control signal from the processor to the first flash memory in accordance with the first process;

releasing, with the processor, the allocated first process after transmission of the first control signal to the first flash memory;

allocating, with the processor and after the processor releases the first process, a second process for controlling a second memory operation performed by a second flash memory;

transmitting a second control signal from the processor to the second flash memory in accordance with the second process;

releasing, with the processor, the allocated second process after transmission of the second control signal to the second flash memory;

transmitting, from the first flash memory to the processor, an interrupt signal after the control signal received by the first flash memory is used by the first flash memory;

reallocating, with the processor and after receiving the interrupt signal from the first flash memory, the first process for controlling the first memory operation, so as to continue the first memory operation.

6. The method of claim 5, wherein the first memory operation and the second memory operation include at least one of a read operation, a write operation, an erase operation, and a copy operation.

7. The method of claim 5, wherein the first memory operation starts in response to the first flash memory receiving the control signal from the processor.

8. A non-transitory computer readable recording media storing a program implementing a method of controlling a flash memory, the method comprising:

allocating, with a processor, a first process for controlling a first memory operation performed by a first flash memory;

transmitting a first control signal from the processor to the first flash memory in accordance with the first process;

releasing, with the processor, the allocated first process after completing transmission of the first control signal to the first flash memory;

allocating, with the processor and after the processor releases the first process, a second process for controlling a second memory operation performed by a second flash memory;

transmitting a second control signal from the processor to the second flash memory in accordance with the second process;

releasing, with the processor, the second process after transmission of the control signal to the second flash memory;

reallocating, with the processor and after the processor receives an interrupt signal from the first flash memory, the first process for controlling the first memory operation, so as to continue the first memory operation.

9. A flash memory apparatus to perform memory operations in parallel, the apparatus comprising:

a plurality of flash memory units including first and second flash memory units that are each configured to store data and to generate an interrupt signal; and a processor configured to allocate a process for controlling each memory operation performed by the flash memory units, the processor further configured to transmit a control signal to a respective one of the flash memory units in accordance with the process, wherein:

the processor allocates a first process for controlling a first memory operation;

the processor releases first process after transmission of a first control signal, transmitted in accordance with the first process, to the first flash memory unit, the processor allocates a second process for controlling a second memory operation after releasing the first process;

the processor releases the second process after transmission of a second control signal, transmitted in accordance with the second process, to the second flash memory unit, the first flash memory transmits the interrupt signal to the processor after using the first control signal transmitted by the processor, and the processor reallocates the first process for controlling the first memory operation after receiving the interrupt signal from the first flash memory unit, so as to continue the first memory operation.

\* \* \* \* \*